United States Patent
Kato (10) Patent No.: US 10,484,557 B2
(45) Date of Patent: Nov. 19, 2019

(54) IMAGE PROCESSING APPARATUS AND NON-TRANSITORY COMPUTER READABLE MEDIUM FOR ADDITION OF DIFFERENT IMAGE DATA TO ACQUIRED IMAGE DATA

(71) Applicant: FUJI XEROX CO., LTD., Tokyo (JP)

(72) Inventor: Seishiro Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 18 days.

(21) Appl. No.: 15/689,269

(22) Filed: Aug. 29, 2017

(65) Prior Publication Data
US 2018/0278777 A1    Sep. 27, 2018

(30) Foreign Application Priority Data
Mar. 22, 2017   (JP) .................. 2017-056351

(51) Int. Cl.
*H04N 1/00* (2006.01)
*H04N 1/23* (2006.01)

(52) U.S. Cl.
CPC ....... *H04N 1/00708* (2013.01); *H04N 1/2323* (2013.01); *H04N 2201/3221* (2013.01)

(58) Field of Classification Search
CPC ............ H04N 1/00708; H04N 1/2323; H04N 2201/3221
See application file for complete search history.

(56) References Cited

U.S. PATENT DOCUMENTS

2009/0310991 A1* 12/2009 Isogai ............... H04N 1/00681
                                                    399/45
2016/0316096 A1* 10/2016 Matsuki ............ H04N 1/32133

FOREIGN PATENT DOCUMENTS

| JP | 2007-19925  A | 1/2007 |
| JP | 2007-199925 A | 8/2007 |
| JP | 2007-251359 A | 9/2007 |

* cited by examiner

*Primary Examiner* — Christopher Wait
(74) *Attorney, Agent, or Firm* — Oliff PLC (57) ABSTRACT

An image processing apparatus includes an acquisition unit, an identification unit, and a generation unit. The acquisition unit acquires image data generated by reading an image on an original. The identification unit identifies a predetermined size of an original, the predetermined size being different from a size of the original. The generation unit adds image data of a different image to the acquired image data, without changing a size of the image in the acquired image data, to generate image data corresponding to the predetermined size of the original.

10 Claims, 10 Drawing Sheets

| INPUT ORIGINAL SIZE | OUTPUT ORIGINAL SIZE | ADDITIONAL IMAGE SIZE |
|---|---|---|
| A5 SIZE | B5 SIZE | FOR A5 SIZE |
| B5 SIZE | A4 SIZE | FOR B5 SIZE |
| A4 SIZE | B4 SIZE | FOR A4 SIZE |
| B4 SIZE | A3 SIZE | FOR B4 SIZE |
| ⋮ | ⋮ | ⋮ |

| INPUT ORIGINAL SIZE | OUTPUT ORIGINAL SIZE | ADDITIONAL IMAGE SIZE |
|---|---|---|
| A5 SIZE | B5 SIZE | FOR A5 SIZE |
| B5 SIZE | A4 SIZE | FOR B5 SIZE |
| A4 SIZE | B4 SIZE | FOR A4 SIZE |
| B4 SIZE | A3 SIZE | FOR B4 SIZE |
| ⋮ | ⋮ | ⋮ |

IMAGE PROCESSING APPARATUS AND NON-TRANSITORY COMPUTER READABLE MEDIUM FOR ADDITION OF DIFFERENT IMAGE DATA TO ACQUIRED IMAGE DATA

CROSS-REFERENCE TO RELATED APPLICATIONS

This application is based on and claims priority under 35 USC 119 from Japanese Patent Application No. 2017-056351 filed Mar. 22, 2017.

BACKGROUND

Technical Field

The present invention relates to an image processing apparatus and a non-transitory computer readable medium.

SUMMARY

According to an aspect of the invention, there is provided an image processing apparatus including an acquisition unit, an identification unit, and a generation unit. The acquisition unit acquires image data generated by reading an image on an original. The identification unit identifies a predetermined size of an original, the predetermined size being different from a size of the original. The generation unit adds image data of a different image to the acquired image data, without changing a size of the image in the acquired image data, to generate image data corresponding to the predetermined size of the original.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to attached drawings.

<Hardware Configuration of Image Processing Apparatus>

Figure 1:
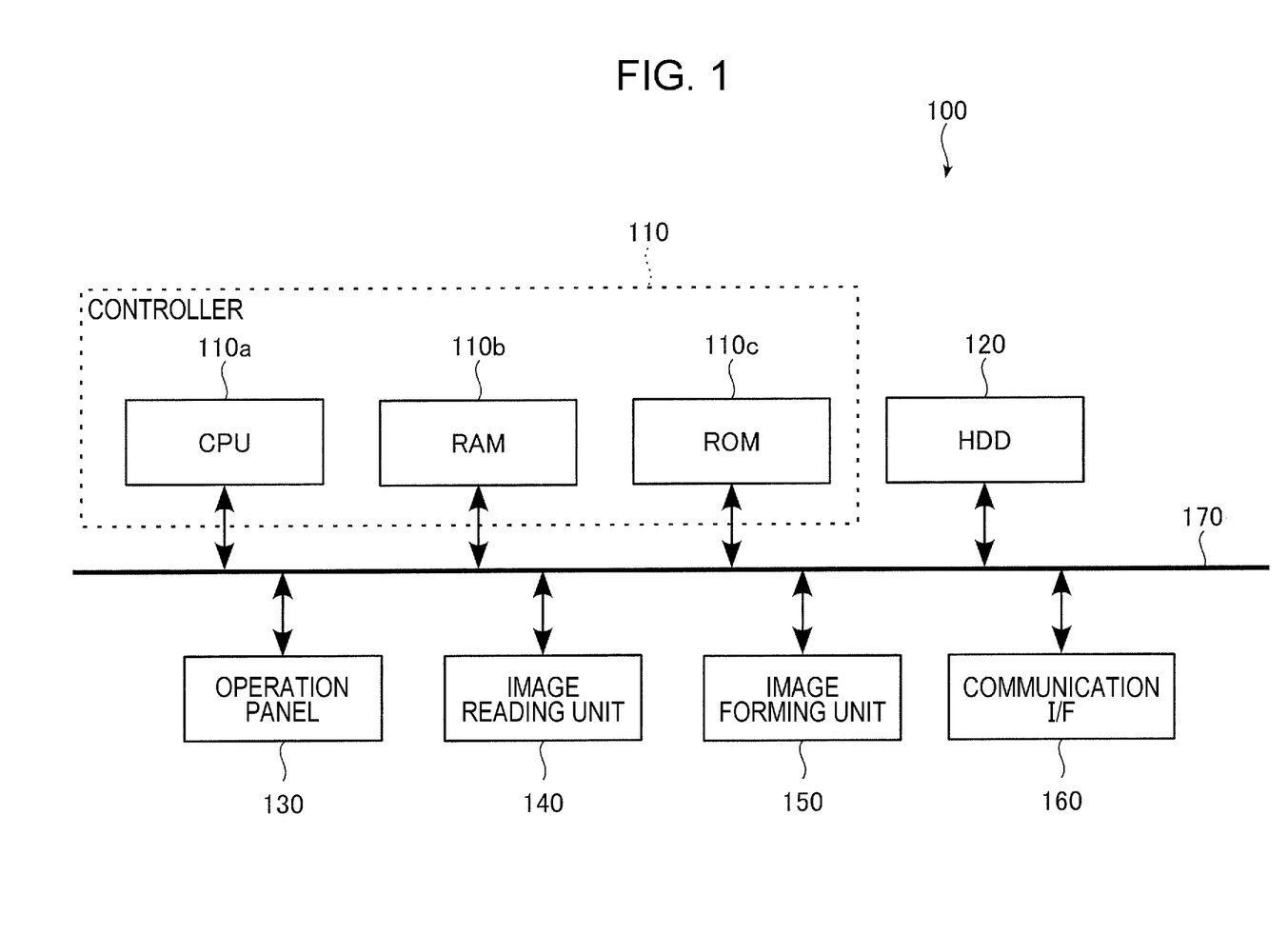
FIG. 1 is a diagram illustrating an example of a hardware configuration of an image processing apparatus according to an exemplary embodiment of the present invention.

First, a hardware configuration of an image processing apparatus 100 according to an exemplary embodiment of the present invention will be described. FIG. 1 is a diagram illustrating an example of the hardware configuration of the image processing apparatus 100 according to the exemplary embodiment of the present invention. The image processing apparatus 100 according to this exemplary embodiment is a so-called multifunction apparatus which includes various image processing functions such as, for example, an image reading function (scan function), a print function, a copy function, and a facsimile function.

As illustrated in FIG. 1, the image processing apparatus 100 according to this exemplary embodiment includes a controller 110, a hard disk drive (HDD) 120, an operation panel 130, an image reading unit 140, an image forming unit 150, and a communication interface (hereinafter, denoted by a "communication I/F") 160. These functional units are connected to a bus 170 and transmit and receive data via the bus 170.

The controller 110 controls operation of each unit of the image processing apparatus 100. The controller 110 includes a central processing unit (CPU) 110a, a random access memory (RAM) 110b, and a read only memory (ROM) 110c.

The CPU 110a implements each function of the image processing apparatus 100 by loading various programs stored in the ROM 110c or the like into the RAM 110b and executing the programs. The RAM 110b is a memory which is used as an operation memory or the like for the CPU 110a. The ROM 110c is a memory which stores various programs and the like to be executed by the CPU 110a.

The HDD 120 is a memory which stores various data. In the HDD 120, for example, image data generated by image reading by the image reading unit 140, image data received from the outside by the communication I/F 160, and the like are stored.

The operation panel 130 displays various types of information and receives operations from a user. The operation panel 130 includes a display panel which includes a liquid crystal display or the like, a touch panel which is arranged on the display panel and detects the position touched by a user, a physical key which is to be pressed by the user, and the like. For example, the operation panel 130 displays various screens including an operation screen of the image processing apparatus 100 on the display panel, and receives, with the touch panel and the physical key, operations from the user.

The image reading unit 140 reads (scans) an image formed on a recording material (original) such as paper set on an original platen, and generates image data representing the read image. The image reading unit 140 may be, for example, a scanner of a charge coupled devices (CCD) type which reduces, with a lens, reflection light with respect to light applied to an original from a light source and receives, with a CCD, the reflection light or a scanner of a contact image sensor (CIS) type which receives, with a CIS, reflection light with respect to light sequentially applied to an original from a light emitting diode (LED) light source.

The image forming unit 150 is a printing mechanism for forming images on a recording material such as paper. The image forming unit 150 may be, for example, a printer of an electrophotographic system which transfers toner adhered to a photoreceptor to a recording material to form an image or a printer of an inkjet type which ejects ink to a recording material to form an image.

The communication I/F 160 is a communication interface which performs transmission and reception of various data to and from other apparatuses via a network which is not illustrated in FIG. 1.

In the image processing apparatus 100, under the control of the controller 110, the scan function is implemented by the image reading unit 140, the print function is implemented by the image forming unit 150, the copy function is implemented by the image reading unit 140 and the image forming unit 150, and the facsimile function is implemented by the image reading unit 140, the image forming unit 150, and the communication I/F 160.

Furthermore, hereinafter, image data generated by reading an image on an original by the image reading unit 140 may be referred to as "input original data", and output image data to be used when the image processing apparatus 100 outputs an image on an original read by the image reading unit 140 may be referred to as "output original data".

Furthermore, an image represented by input original data (image based on input original data) may be referred to as an "input image", and an image represented by output original data (image based on output original data) may be referred to as an "output image".

The size of an original read by the image reading unit 140 may be referred to as an "input original size", and the size of an original when an image on an original read by the image reading unit 140 is output by the image processing apparatus 100 may be referred to as an "output original size". The input original size may be regarded as the size of an input image, and the output original size may be regarded as the size of an output image.

<Functional Configuration of Image Processing Apparatus>

Figure 2:
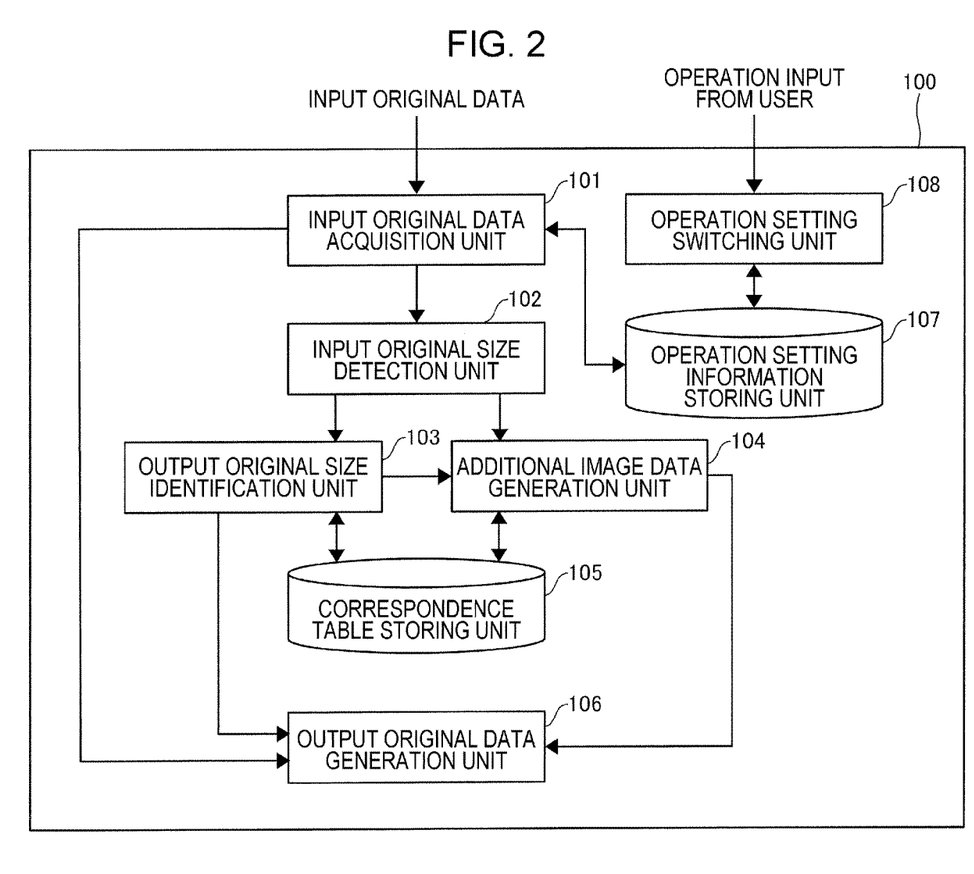
FIG. 2 is a block diagram illustrating an example of a functional configuration of an image processing apparatus according to an exemplary embodiment of the present invention.

Next, a functional configuration of the image processing apparatus 100 according to this exemplary embodiment will be described. FIG. 2 is a block diagram illustrating an example of the functional configuration of the image processing apparatus 100 according to this exemplary embodiment.

The image processing apparatus 100 according to this exemplary embodiment includes two operation settings: a first operation setting and a second operation setting. The first operation setting is for outputting an image on an original read by the image reading unit 140 with a size corresponding to the original (an original which is set on the original platen of the image reading unit 140), that is, an input original size. The second operation setting is for outputting an image on an original read by the image reading unit 140 with a size different from the size corresponding to the original, in other words, a size larger than the size corresponding to the original.

Additionally, the first operation setting is for outputting an image on an original read by the image reading unit 140 with an input original size. The second operation setting is for outputting an image on an original read by the image reading unit 140 with an output original size which is different from the input original size, in other words, with the output original size, which is larger than the input original size.

Moreover, at the second operation setting, different image data is added to the input original data, so that output original data is generated. The different image data is added to indicate that input original data (or output original data) is generated by reading an image on an original. In other words, the different image data is added to indicate that an input image does not represent an original image but is an image generated by reading the original image.

Hereinafter, different image data to be added to input original data may be referred to as "additional image data", and an image based on the additional image data (that is, an image to be added to an input image) may be referred to as an "additional image". In this exemplary embodiment, an additional image is used as an example of a different image.

The image processing apparatus 100 including the above operation settings includes, as functional units which relate to data processing and the like, an input original data acquisition unit 101, an input original size detection unit 102, an output original size identification unit 103, an additional image data generation unit 104, an output original data generation unit 106, and an operation setting switching unit 108. The image processing apparatus 100 also includes, as functional units which relate to data storing and the like, a correspondence table storing unit 105 and an operation setting information storing unit 107.

The input original data acquisition unit 101 acquires input original data generated by reading an image on an original by the image reading unit 140. In the case where the image processing apparatus 100 is operating at the first operation setting, the input original data acquisition unit 101 outputs the acquired input original data to the output original data generation unit 106. In contrast, in the case where the image processing apparatus 100 is operating at the second operation setting, the input original data acquisition unit 101 outputs the acquired input original data to the output original data generation unit 106, and also to the input original size detection unit 102.

At the second operation setting, the input original size detection unit 102 detects an input original size, based on the data contents of input original data acquired from the input original data acquisition unit 101. For example, the input original size detection unit 102 compares each of A sizes and B sizes, which are general standards, with the size of an original of the input original data, and detects the input original size. More specifically, for example, in the case where input original data is generated by reading an image on an original of an A4 size by the image reading unit 140, the input original size detection unit 102 detects, based on the data contents of the input original data, that the input original size is the A4 size.

At the second operation setting, the output original size identification unit 103 identifies, based on the input original size detected by the input original size detection unit 102, an output original size, which is a predetermined size different from the input original size. The output original size identification unit 103 refers to a correspondence table stored in the correspondence table storing unit 105 to identify an output original size corresponding to the input original size.

The correspondence table storing unit 105 stores a correspondence table in which an input original size and an output original size are associated with each other in advance. The details of the correspondence table will be described later. In this exemplary embodiment, a correspondence table is used as an example of a correspondence.

At the second operation setting, the additional image data generation unit 104 generates additional image data to be added to input original data. The additional image data generation unit 104 identifies the size of an additional image, based on the input original size detected by the input original size detection unit 102 and the output original size identified by the output original size identification unit 103. Then, the additional image data generation unit 104 generates image data of the additional image having the identified size.

Within the additional image, an image including information to be transmitted to the outside (hereinafter, referred to as a notification image) is arranged. The details of the notification image will be described later.

At the first operation setting, the output original data generation unit 106 outputs input original data acquired from the input original data acquisition unit 101 directly as output original data to, for example, the operation panel 130, the image forming unit 150, or the like. For example, in the case where the output original data is output to the operation panel 130, an input image of the input original size is displayed on the screen. For example, in the case where the output original data is output to the image forming unit 150, an input image is formed and output to paper of the input original size.

At the second operation setting, the output original data generation unit 106 adds an additional image to an input image of input original data acquired from the input original data acquisition unit 101, without changing the input image, and generates output original data corresponding to an output original size. Then, the output original data generation unit 106 outputs the generated output original data to, for example, the operation panel 130, the image forming unit 150, or the like. For example, in the case where the output original data is output to the operation panel 130, an output image of the output original size is displayed on the screen. For example, in the case where the output original data is output to the image forming unit 150, an output image is formed and output to paper of the output original size.

Additionally, at the second operation setting, the output original data generation unit 106 adds an additional image to an input image, without changing the input image, such that the contents of the input image are maintained. Depending on the processing of the output original data generation unit 106, an error may occur between the input image based on the input original data and the input image contained in the output original data. Accordingly, the output original data generation unit 106 may be regarded as a unit which generates, at the second operation setting, output original data such that the degree of a difference between an input image based on input original data and an input image contained in output original data is smaller than a predetermined degree.

The operation setting information storing unit 107 stores setting information (hereinafter, referred to as operation setting information) which represents an operation setting at which the image processing apparatus 100 is operating. For example, in the case where the image processing apparatus 100 is operating at the first operation setting, operation setting information indicates that the image processing apparatus 100 is operating at the first operation setting.

The operation setting switching unit 108 performs switching between operation settings for the image processing apparatus 100. The operation setting switching unit 108 rewrites, based on, for example, an operation input from a user, operation setting information stored in the operation setting information storing unit 107, and performs switching between operation settings for the image processing apparatus 100. For example, in the case where the first operation setting is set as a default setting for the image processing apparatus 100, when a user performs an operation input for switching to the second operation setting, the operation setting switching unit 108 performs processing for rewriting the operation setting information stored in the operation setting information storing unit 107 from the first operation setting to the second operation setting. Thus, the image processing apparatus 100 comes to operate at the second operation setting.

The individual functional units constituting the image processing apparatus 100 illustrated in FIG. 2 are implemented by cooperation of software and hardware resources. Specifically, in the case where the image processing apparatus 100 is implemented with the hardware configuration illustrated in FIG. 1, for example, when a program of an operating system (OS) and an application program stored in the ROM 110c are read to the RAM 110b and executed by the CPU 110a, the individual functional units including the input original data acquisition unit 101, the input original size detection unit 102, the output original size identification unit 103, the additional image data generation unit 104, the output original data generation unit 106, and the operation setting switching unit 108 are implemented. Furthermore, the correspondence table storing unit 105 and the operation setting information storing unit 107 are implemented by, for example, the HDD 120 or the like.

In this exemplary embodiment, as an acquisition unit, the input original data acquisition unit 101 is used. As an example of an identification unit, the output original size identification unit 103 is used. As an example of a generation unit, the output original data generation unit 106 is used. As an example of an output unit, the output original data generation unit 106, the operation panel 130, and the image forming unit 150 are used. As an example of a switching unit, the operation setting switching unit 108 is used.

<Explanation for Correspondence Table>

Figure 3:
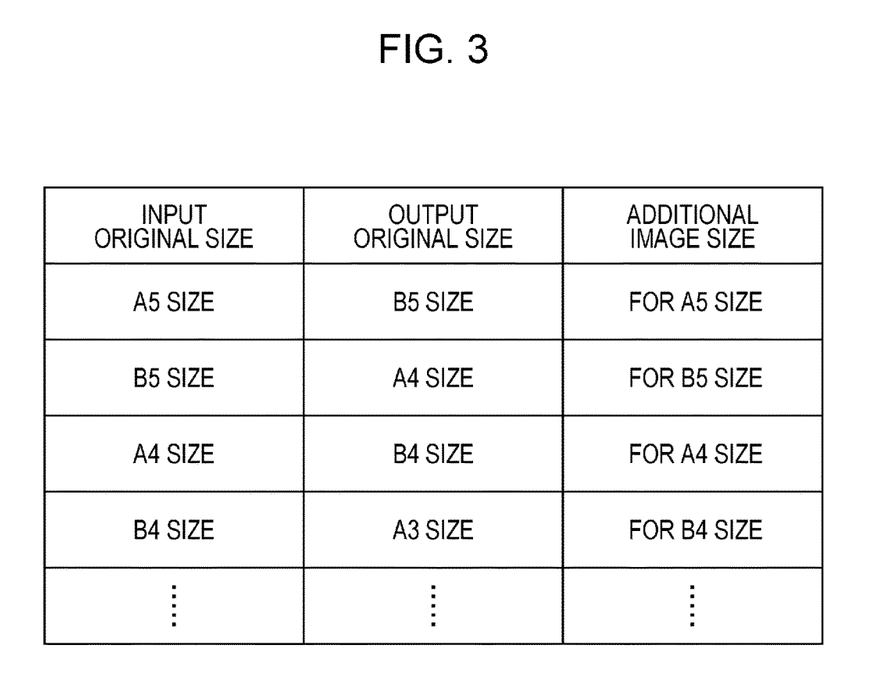
FIG. 3 is a diagram illustrating an example of a correspondence table which is stored in a correspondence table storing unit.

Next, a correspondence table stored in the correspondence table storing unit 105 will be described. FIG. 3 is a diagram illustrating an example of a correspondence table stored in the correspondence table storing unit 105.

In the correspondence table, "input original size", "output original size", and "additional image size" are defined. An output original size is larger than an input original size. For example, an output original size is one size larger than an input original size. In the example illustrated in FIG. 3, input original sizes and output original sizes are defined by general A sizes and B sizes. Furthermore, among A sizes and B sizes, an output original size is defined as a size which is next larger than an input original size.

More specifically, in the example illustrated in FIG. 3, an A5 size, a B5 size, an A4 size, and a B4 size are defined as input original sizes. Furthermore, the B5 size, the A4 size, the B4 size, and an A3 size are defined as output original sizes corresponding to the A5 size, the B5 size, the A4 size, and the B4 size, respectively. For example, in the case where an input original size is the A5 size, the B5 size, which is next larger than the A5 size among A sizes and B sizes, is defined as the output original size.

Furthermore, the additional image size is a size which is identified based on the input original size and the output original size. Specifically, the size obtained by subtracting the input original size from the output original size is equal to the additional image size. Additionally, the sum of the input original size and the additional image size is equal to the output original size. In the example illustrated in FIG. 3, as additional image sizes, a size for the A5 size, a size for the B5 size, a size for the A4 size, and a size for the B4 size are defined. For example, the additional image size for the A5 size is equal to the size obtained by subtracting the A5 size, which is the input original size, from the B5 size, which is the output original size.

Additionally, at the second operation setting, the output original size identification unit 103 refers to the correspondence table to identify the output original size corresponding to the input original size detected by the input original size detection unit 102.

Furthermore, at the second operation setting, the additional image data generation unit 104 refers to the correspondence table to identify the additional image size corresponding to the input original size detected by the input original size detection unit 102. However, the additional image data generation unit 104 may identify the additional image size, without referring to the correspondence table, by subtracting the input original size detected by the input original size detection unit 102 from the output original size identified by the output original size identification unit 103.

Furthermore, in the correspondence table illustrated in FIG. 3, A sizes and B sizes of general standards are defined as input original sizes. However, if the size of an original detected by the input original size detection unit 102 is a non-standard size which does not conform to general standards, the detected size may not be defined in the correspondence table. In such a case, for example, the output original size identification unit 103 selects, among input original sizes defined in the correspondence table, an input original size which is larger than the non-standard size detected by the input original size detection unit 102 and closest to the non-standard size. Then, the output original size identification unit 103 identifies an output original size corresponding to the selected input original size.

For example, a case where the size of an original detected by the input original size detection unit 102 is a size between the B5 size and the A4 size will be explained. In this case, the output original size identification unit 103 selects, from among input original sizes defined in the correspondence table, the A4 size, which is larger than and closest to the detected size of the original. Then, the output original size identification unit 103 identifies the B4 size, which corresponds to the A4 size, as the output original size.

However, the output original size identification unit 103 may identify the A4 size, which is larger than and closest to the detected size of the original, as the output original size, instead of identifying the B4 size as the output original size as described in the above example. In this case, the detected size of the original is a size between the B5 size and the A4 size, and therefore, even if the A4 size is identified as the output original size, a difference occurs between an input image and an output image. Thus, the additional image data generation unit 104 may generate additional image data, which represents an additional image indicating the difference. In other words, in this exemplary embodiment, in the case where the size of the original detected by the input original size detection unit 102 is not defined in the correspondence table, the output original size identification unit 103 may identify, among output original sizes defined in the correspondence table, an output original size which is larger than the detected size of the original and closest to the detected size of the original.

<Explanation for Processing for Generating Output Image at Second Operation Setting>

Figure 4:
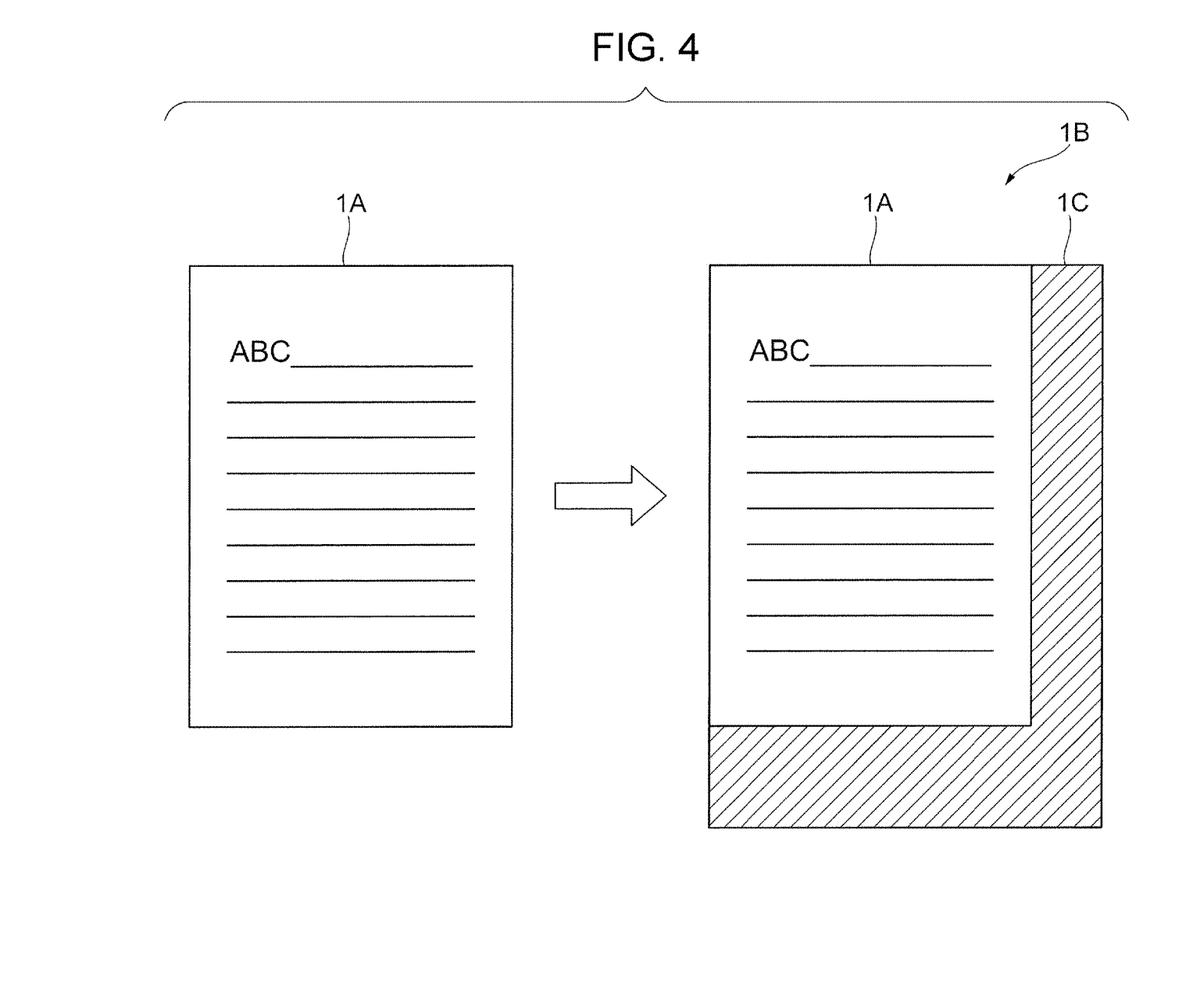
FIG. 4 is a diagram for explaining an example of processing for generating an output image at a second operation setting.

Next, processing for generating an output image at the second operation setting will be explained by way of a specific example. FIG. 4 is a diagram for explaining an example of processing for generating an output image at the second operation setting. A left-hand image in FIG. 4 is an input image 1A based on input original data. A right-hand image in FIG. 4 is an output image 1B based on output original data. By adding an additional image 1C represented by oblique lines to the input image 1A, the output image 1B is generated.

For example, regarding the input image 1A illustrated in FIG. 4, the longitudinal direction of the original is an erecting direction, and the input original size is the A5 size. The erecting direction represents a direction in which characters in the original may be read correctly. Referring to the correspondence table illustrated in FIG. 3, an output original size corresponding to the input original size of the A5 size is the B5 size. Thus, the additional image data generation unit 104 generates the additional image 1C of a size obtained by subtracting the A5 size from the B5 size. Then, the output original data generation unit 106 adds the generated additional image 1C to the input image 1A to generate the output image 1B of the B5 size.

In the example illustrated in FIG. 4, the additional image 1C is added in a region on a lower right side of the input image 1A. However, the position of the additional image to be added to the input image is not limited to this.

Figure 5A:
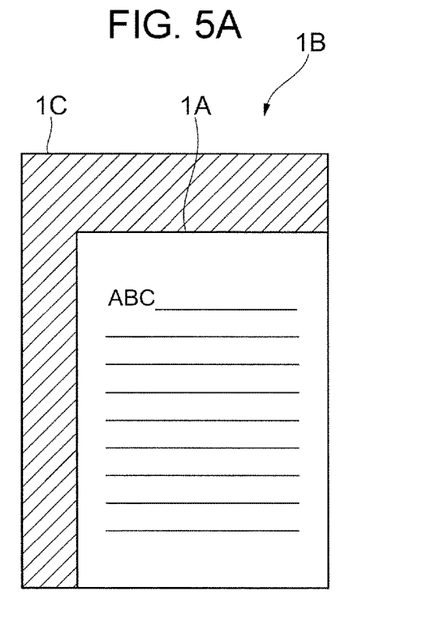
FIGS. 5A to 5D are diagrams illustrating other examples of the position of an additional image.
Figure 5B:
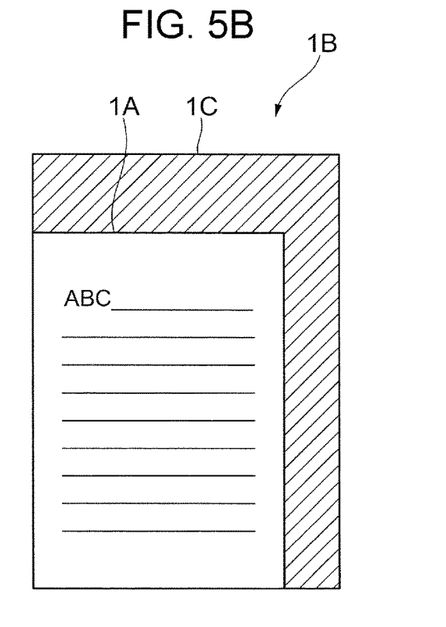
Figure 5C:
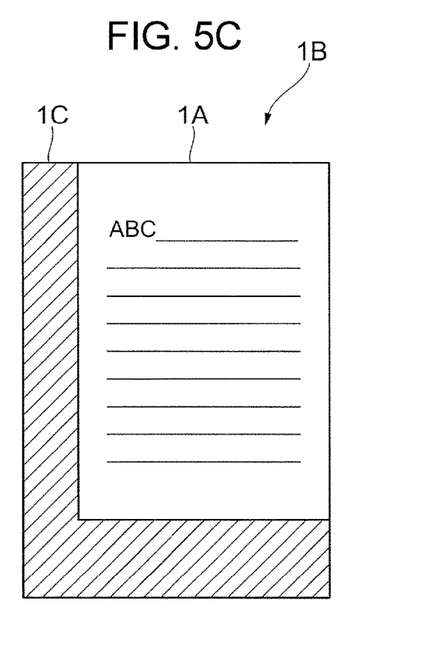
Figure 5D:
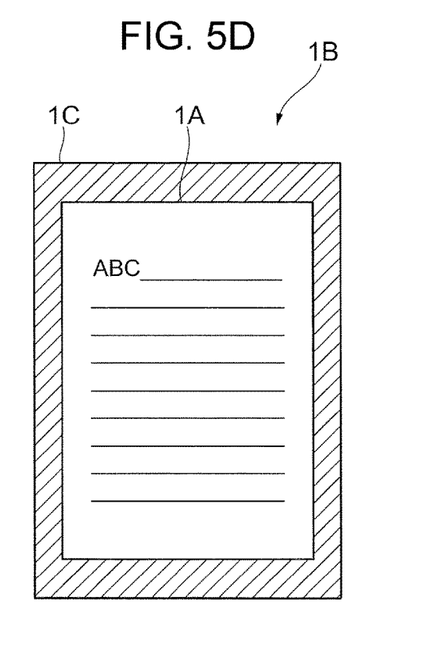

FIGS. 5A to 5D are diagrams illustrating other examples of the position of an additional image. The additional image 1C illustrated in FIG. 5A is added in a region on an upper left side of the input image 1A. The additional image 1C illustrated in FIG. 5B is added in a region on an upper right side of the input image 1A. The additional image 1C illustrated in FIG. 5C is added in a region on a lower left side of the input image 1A. The additional image 1C illustrated in FIG. 5D is added in a region around the input image 1A.

Figure 6A:
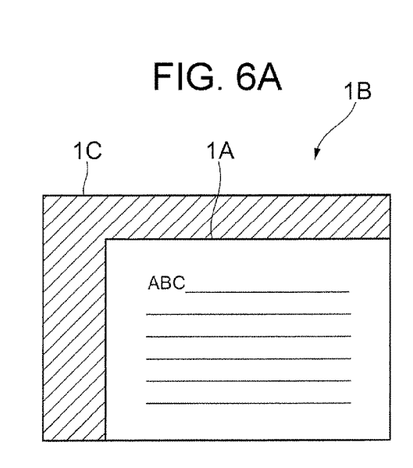
FIGS. 6A to 6E are diagrams illustrating other examples of the position of an additional image.
Figure 6B:
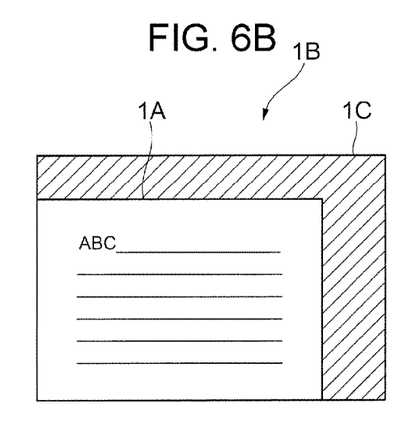
Figure 6C:
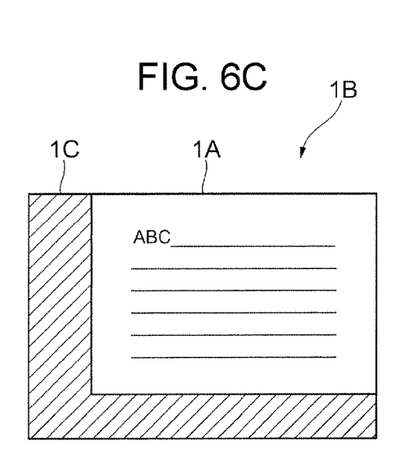
Figure 6D:
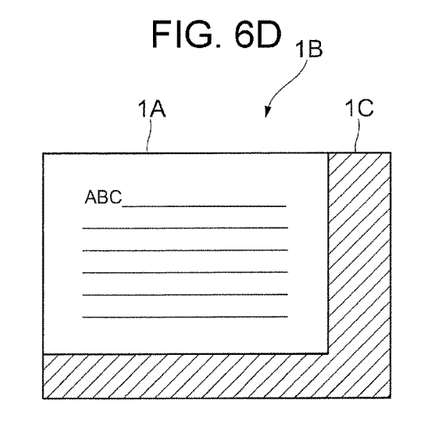
Figure 6E:
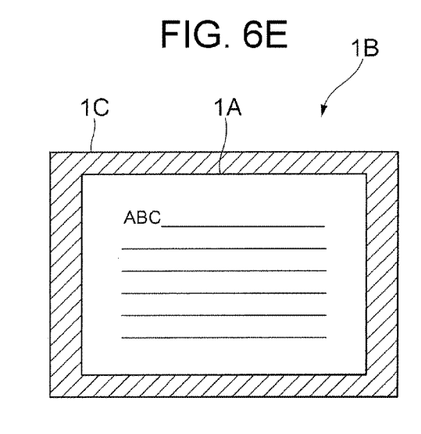

Furthermore, FIGS. 6A to 6E and FIGS. 7A to 7D are diagrams illustrating other examples of the position of an additional image. FIGS. 6A to 6E illustrate examples of a case where the erecting direction of the input image 1A is the transverse direction of the original. The additional image 1C illustrated in FIG. 6A is added in a region on an upper left side of the input image 1A. The additional image 1C illustrated in FIG. 6B is added in a region on an upper right side of the input image 1A. The additional image 1C illustrated in FIG. 6C is added in a region on a lower left side of the input image 1A. The additional image 1C illustrated in FIG. 6D is added in a region on a lower right side of the input image 1A. The additional image 1C illustrated in FIG. 6E is added in a region around the input image 1A.

Figure 7A:
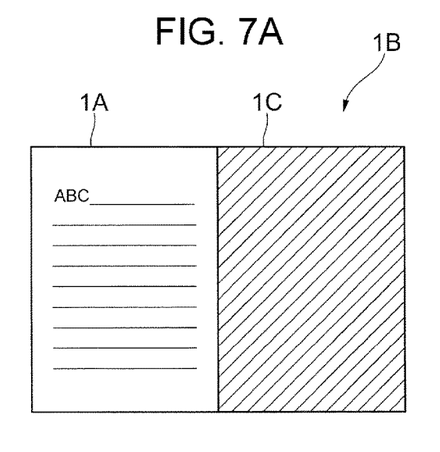
FIGS. 7A to 7D are diagrams illustrating other examples of the position of an additional image.
Figure 7B:
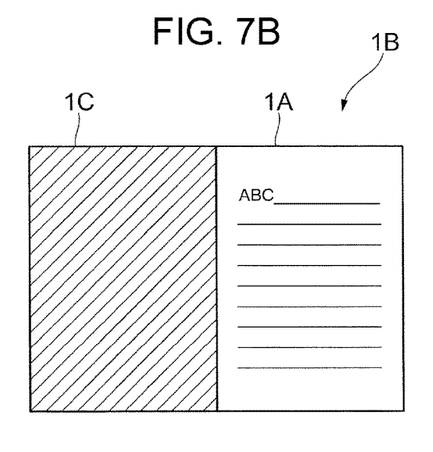
Figure 7C:
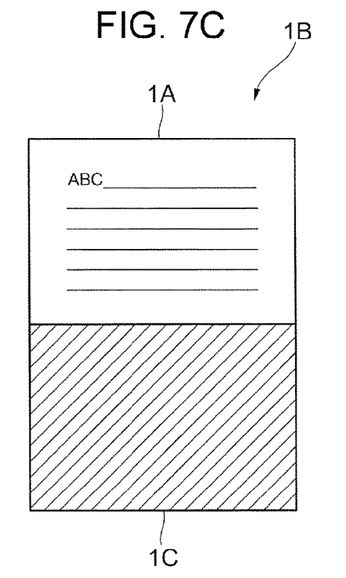
Figure 7D:
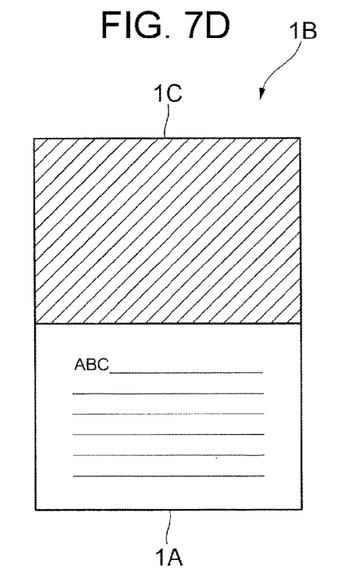

FIGS. 7A and 7B illustrate other examples of a case where the erecting direction of the input image 1A is the longitudinal direction of the original. The additional image 1C illustrated in FIG. 7A is added in a region on a right side of the input image 1A. The additional image 1C illustrated in FIG. 7B is added in a region on a left side of the input image 1A. FIGS. 7C and 7D illustrate examples of a case where the erecting direction of the input image 1A is the transverse direction of the original. The additional image 1C illustrated in FIG. 7C is added in a region on a lower side of the input image 1A. The additional image 1C illustrated in FIG. 7D is added in a region on an upper side of the input image 1A.

Additionally, the examples illustrated in FIGS. 7A to 7D are examples of a case where the output original size (area) is twice the input original size (area). For example, in the case where an input original size is an A size, by setting an A size which is next larger than the A size of the input original size as an output original size, the output original size that is twice the input original size is obtained. Furthermore, for example, in the case where an input original size is a B size, by setting a B size which is next larger than the B size of the input original size as an output original size, the output original size that is twice the input original size is obtained.

For example, in the case where an input original size is the A5 size, by setting an output original size to the A4 size, which is an A size next larger than the A5 size, the output original size that is twice the input original size is obtained. Furthermore, for example, in the case where an input original size is the B5 size, by setting an output original size to the B4 size, which is a B size next larger than the B5 size, the output original size that is twice the input original size is obtained. In the above cases, by adding the additional image 1C having the same size as the input original size to the input image 1A, the output image 1B of the output original size is generated.

As illustrated in FIG. 4, FIGS. 5A to 5D, FIGS. 6A to 6E, and FIGS. 7A to 7D, there are multiple candidates for position of an additional image to be added to an input image, and any one of the position among the multiple candidates is adopted in accordance with a predetermined procedure. In this exemplary embodiment, a user may determine the position of an additional image or the image processing apparatus 100 may determine the position of an additional image.

In the case where a user determines the position of an additional image, for example, the positions illustrated in FIG. 4, FIGS. 5A to 5D, FIGS. 6A to 6E, and FIGS. 7A to 7D are displayed on the operation panel 130 as candidates for the position of an additional image. When the user selects one of the displayed candidates, the additional image data generation unit 104 generates additional image data so that the additional image is added at the selected position. Then, the output original data generation unit 106 adds the additional image to the input image at the position selected by the user to generate output original data.

Furthermore, in the case where the image processing apparatus 100 determines the position of an additional image, the additional image data generation unit 104 determines the position of the additional image in accordance with a predetermined rule, and generates additional image data so that the additional image is added at the determined position. Then, the output original data generation unit 106 adds the additional image to the input image at the position determined by the additional image data generation unit 104 to generate output original data.

A the predetermined rule, the position of an additional image may be determined by default, the position of an additional image may be determined according to the contents of an input image, or the like.

More specifically, for example, the additional image data generation unit 104 performs processing such as optical character recognition (OCR) on an input image, and identifies the orientation of the input image (erecting direction of an input image). Then, the additional image data generation unit 104 determines that an additional image is to be added to a default position corresponding to the identified orientation of the input image. For example, in the case where the erecting direction of an input image is the longitudinal direction of an original, an additional image is added at a default position among the positions illustrated in FIG. 4, FIGS. 5A to 5D, and FIGS. 7A and 7B.

Figure 8:
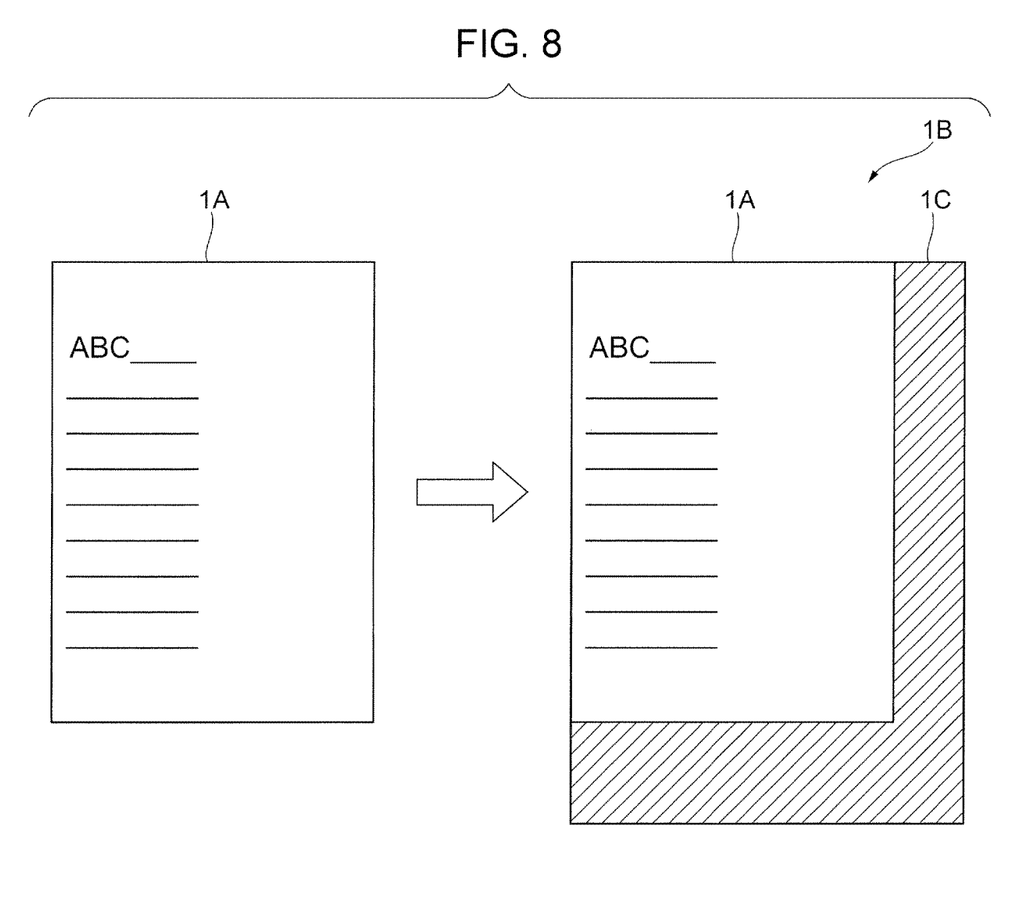
FIG. 8 is a diagram for explaining an example of processing for determining the position of an additional image according to the contents of an input image.

FIG. 8 is a diagram for explaining an example of processing for determining the position of an additional image according to the contents of an input image. The erecting direction of the input image 1A illustrated in FIG. 8 is the longitudinal direction of an original. In this example, a document within the input image 1A is close to the left as a whole, and there is a space (margin) in a right-hand region of the input image 1A. For example, in the case where an additional image is added in a region on a left side of the input image 1A, it is difficult to tell the difference between the document within the input image 1A and a notification image arranged within the additional image 1C. Therefore, it may be difficult for a user to find that the notification image is present.

Thus, the additional image data generation unit 104 examines distribution of a document contained in the input image 1A and a space which is present within the input image 1A to determine the position of the additional image 1C. For example, the additional image data generation unit 104 determines that the additional image 1C is to be added near a region which is less occupied by a document or near a region including a space within the input image 1A. Distribution of a document and a space within the input image 1A are determined, for example, based on the pixel value of each pixel in the input image 1A. In the example illustrated in FIG. 8, the additional image 1C is added to a region on a right (lower right) side of the input image 1A.

<Explanation for Notification Image Arranged within Additional Image>

Next, a notification image arranged within an additional image will be described in detail. The notification image is an image containing information to be transmitted to the outside. The information to be transmitted to the outside may be, for example, information regarding processing for reading an image on an original and generating input original data (that is, scan processing), information generated based on the contents of an input image, and the like.

First, information regarding scan processing will be explained. The information regarding scan processing may be, for example, information for identifying a user who performed an operation input for issuing an instruction for image reading by the image reading unit 140 (that is, a scan operator). The information for identifying a scan operator may be, for example, a user ID which is assigned in advance to each user, a face photograph which is taken in advance for each user, or the like. For example, a scan operator is identified by personal authentication which is performed at the image processing apparatus 100 before issuance of an instruction to perform scan processing by a user. Then, the additional image data generation unit 104 acquires a user ID or a face photograph of the identified scan operator from a memory such as the HDD 120, and generates a notification image.

By adding a user ID or a face photograph of a scan operator to an input image as a notification image, the person who performed scanning is clearly indicated. Therefore, for example, a document for which scanning is prohibited may be prevented from being scanned, and spreading of the contents of the document may be avoided. Furthermore, even if scanning of the document is performed, tracking of who performed scanning (identification of a scan operator) may be achieved.

Next, information generated based on the contents of an input image will be explained. The information generated based on the contents of an input image may be, for example, part of a document contained in the input image, summary of a document contained in the input image, other documents or uniform resource locators (URLs) related to a document contained in the input image, or the like. Furthermore, the information generated based on the contents of an input image may be, for example, part of an image contained in the input image, other images similar to an image contained in the input image, or the like. Furthermore, the information generated based on the contents of an input image may be, for example, advertising for the contents of the input image, a coupon to provide the right to receive services including price reduction, or the like.

For example, the additional image data generation unit 104 extracts, based on the contents of an input image, part of a document or an image contained in the input image and generates a notification image. Furthermore, for example, the additional image data generation unit 104 acquires other documents or URLs related to a document contained in an input image, other images similar to an image contained in the input image, advertising, a coupon, or the like by searching for information stored in a memory such as the HDD 120 or searching for various types of information via the Internet, and generates a notification image. For example, in the case where information such as advertising, a coupon, or the like is added as a notification image to an input image, notification image data is output in a state in which an additional value is provided to the input image.

Furthermore, in this exemplary embodiment, a notification image may be prepared in advance, instead of being generated. The notification image prepared in advance may be, for example, a notification image containing information for identifying the image reading unit 140 which performed image reading. In this case, the notification image may be, for example, positional information for identifying a place where the image reading unit 140 is installed (that is, place where scanning is performed), a machine ID for identifying the image reading unit 140, and the like. The positional information for identifying a place where scanning is performed may be, for example, an address at which the image reading unit 140 is installed, a map indicating the position of the image reading unit 140, or the like.

Furthermore, the notification image prepared in advance may be, for example, a QR Code®, a watermark, or the like.

As described above, multiple candidates are present in the contents of a notification image, and any one of the multiple candidates is adopted in accordance with a predetermined procedure. In this exemplary embodiment, a user may determine the contents of a notification image, or the image processing apparatus 100 may determine the contents of a notification image.

In the case where a user determines the contents of a notification image, various items including, for example, an ID of a scan operator, the summary of a document, advertising, and the like are displayed as candidates for a notification image on the operation panel 130. When the user selects one of the displayed candidates, the additional image data generation unit 104 generates a notification image containing information of the selected item.

Furthermore, in the case where the image processing apparatus 100 determines the contents of a notification image, for example, the additional image data generation unit 104 generates a notification image containing information of an item determined by default.

Furthermore, in this exemplary embodiment, a user may determine where to arrange a notification image in an additional image or the image processing apparatus 100 may determine where to arrange a notification image in an additional image.

In the case where a user determines the position of a notification image, for example, the user designates the position at which the notification image is to be arranged in an additional image displayed on the operation panel 130. The additional image data generation unit 104 arranges the notification image at the designated position to generate image data of the additional image. Furthermore, in the case where the image processing apparatus 100 determines the position of a notification image, for example, the additional image data generation unit 104 arranges the notification image at the position in the additional image determined by default.

The additional image data generation unit 104 arranges the notification image so as to fall within the additional image. For example, in the case where a notification image is arranged at a default position within an additional image, the notification image may extend beyond the additional image. In such a case, the additional image data generation unit 104 shifts the notification image from the default position so as not to extend beyond the additional image.

In this exemplary embodiment, the number of notification images arranged within an additional image is not necessarily limited to one, and plural notification images may be arranged within an additional image. For example, plural notification images indicating information of advertising may be arranged within an additional image. Furthermore, the number of types of notification images arranged within an additional image is not limited to one, and plural types of notification images may be arranged within an additional image. For example, a notification image of a user ID of a scan operator and a notification image of advertising may be arranged within an additional image.

<Processing Procedure by Image Processing Apparatus>

Figure 9:
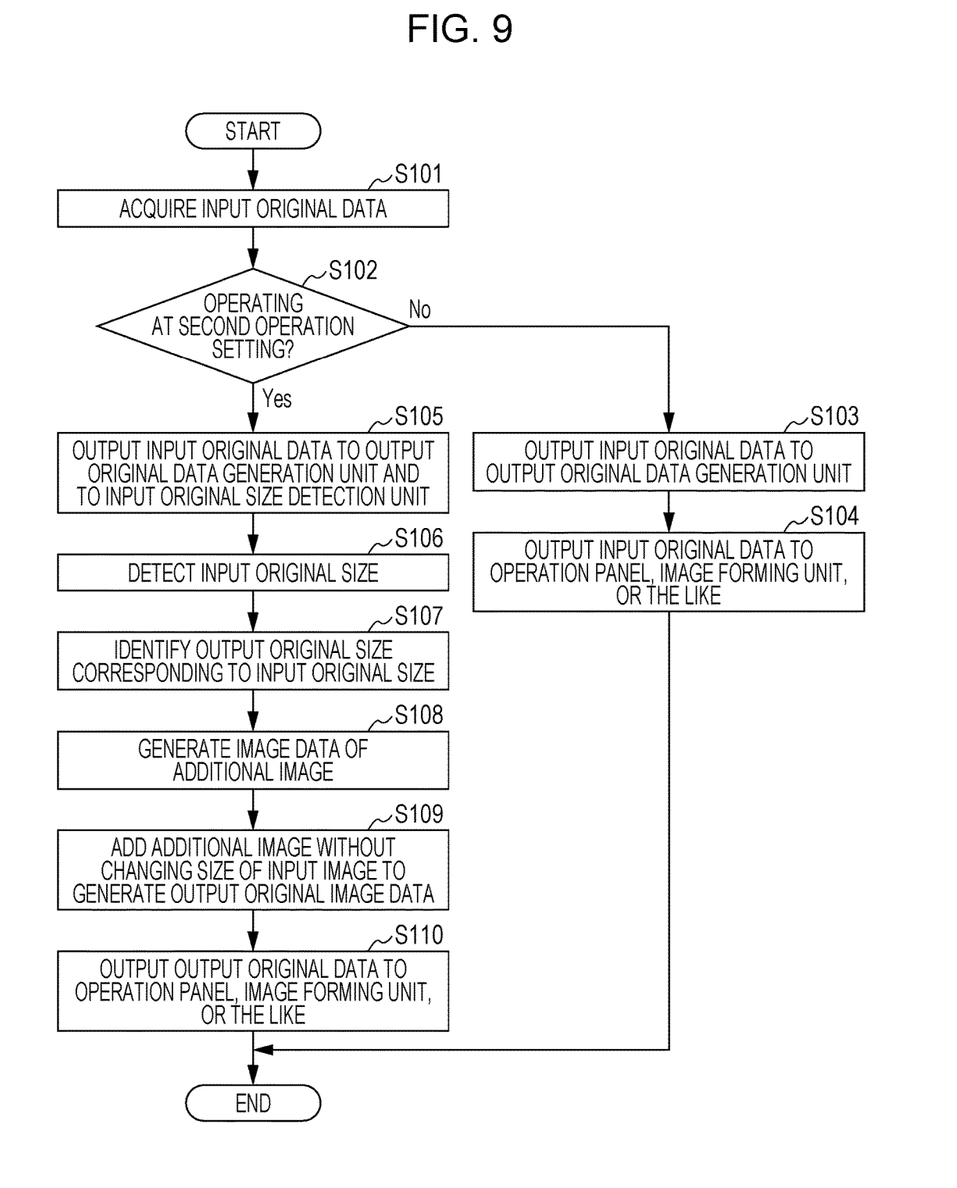
FIG. 9 is a flowchart illustrating an example of a processing procedure at an image processing apparatus from acquisition of input original data to output of output original data.

Next, a processing procedure at the image processing apparatus 100 from acquisition of input original data to output of output original data will be explained. FIG. 9 is a flowchart illustrating an example of a processing procedure at the image processing apparatus 100 from acquisition of input original data to output of output original data.

First, the input original data acquisition unit 101 acquires input original data generated by reading an image on an original by the image reading unit 140 (step 101). Next, the input original data acquisition unit 101 refers to operation setting information stored in the operation setting information storing unit 107 and determines whether or not the image processing apparatus 100 is operating at the second operation setting (step 102).

In the case where the determination result in step 102 is negative (No), the image processing apparatus 100 is operating at the first operation setting. In this case, the input original data acquisition unit 101 outputs the input original data to the output original data generation unit 106 (step 103). Next, the output original data generation unit 106 outputs the input original data acquired from the input original data acquisition unit 101 to, for example, the operation panel 130, the image forming unit 150, or the like (step 104). Then, for example, an input image of an input original size is displayed on the screen of the operation panel 130 or an input image is formed and output to paper of the input original size by the image forming unit 150. Then, the processing flow ends.

In contrast, in the case where the determination result in step 102 is affirmative (Yes), the image processing apparatus 100 is operating at the second operation setting. In this case, the input original data acquisition unit 101 outputs the input original data to the output original data generation unit 106 and also to the input original size detection unit 102 (step 105).

Next, the input original size detection unit 102 detects the input original size, based on the data contents of the acquired input original data (step 106). Next, the output original size identification unit 103 refers to a correspondence table stored in the correspondence table storing unit 105 and identifies an output original size corresponding to the input original size (step 107).

Next, the additional image data generation unit 104 identifies the size of an additional image, based on the input original size and the output original size, and generates image data of the additional image having the identified size (step 108). The additional image data generation unit 104 may refer to the correspondence table stored in the correspondence table storing unit 105 to identify the size of an additional image corresponding to the input original size or may subtract the input original size from the output original size, without referring to the correspondence table, to identify the size of the additional image.

Next, the output original data generation unit 106 adds the additional image to the input image, without changing the size of the input image in the input original data acquired from the input original data acquisition unit 101, to generate output original data (step 109). Then, the output original data generation unit 106 outputs the generated output original data to, for example, the operation panel 130, the image forming unit 150, or the like (step 110). Then, for example, an output image of the output original size is displayed on the screen of the operation panel 130 or an output image is formed and output to paper of the output original size by the image forming unit 150. Then, the processing flow ends.

As described above, at the second operation setting, the image processing apparatus 100 according to this exemplary embodiment adds a different image, without changing the size of an input image in input original data, to generate output original data of a size different from the input original size. The different image is added so as not to be superimposed on the input image, and therefore, an output image is output with the contents of the input image maintained. Furthermore, by adding an additional image to an input image, the fact that the input image contained in the output image is not an original image but an image generated by reading the original image is understood.

Furthermore, in this exemplary embodiment, at the second operation setting, the additional image data generation unit 104 generates additional image data. However, a different apparatus (not illustrated in drawings) may generate additional image data. In this case, for example, input original data is transmitted from the image processing apparatus 100 to the different apparatus. The different apparatus determines, based on the input original data received from the image processing apparatus 100, the size of an additional image to be added to the input image, the position where the additional image is to be added, a notification image, and the like, and generates additional image data. Then, the different apparatus transmits the generated additional image data to the image processing apparatus 100. The image processing apparatus 100 adds the additional image data received from the different apparatus to the input original data to generate output original data.

Furthermore, in this exemplary embodiment, at the second operation setting, the additional image data generation unit 104 generates image data of an additional image. However, additional image data may be prepared in advance. In this case, for example, additional image data corresponding to various input original sizes are stored in advance in the correspondence table storing unit 105. Then, for example, the output original data generation unit 106 acquires additional image data corresponding to the input original size from the correspondence table storing unit 105, and adds the acquired additional image data to the input original data to generate output original data.

In this exemplary embodiment, at the second operation setting, additional image data is added to input original data. However, data of an output original size, which is larger than the input original size, may be output, without adding additional image data to the input original data. In other words, the output original data generation unit 106 may change the size of an original in the input original data acquired from the input original data acquisition unit 101 to an output original size that is larger than the input original size, without changing the size of an input image and without adding an additional image, and output the output original data to, for example, the operation panel 130, the image forming unit 150, or the like.

For example, in the case where output to the operation panel 130 is performed, display on the screen is performed in a state in which a margin is added to the input image of the input original size so that an output original size is obtained as a whole. Furthermore, for example, in the case where output to the image forming unit 150 is performed, paper of an output original size is output, an input image being formed on the paper, and a region corresponding to a difference between the input original size and the output original size is a margin. As described above, also in the case where an original having a size larger than an input original size is output, without adding additional image data to the input original size, the contents of the input image is maintained. Furthermore, the size of the output original is larger than the input original size, and therefore, the fact that the output input image is not an original image but an image generated by reading the original image may be understood.

<Explanation for Applicable Computer>

Figure 10:
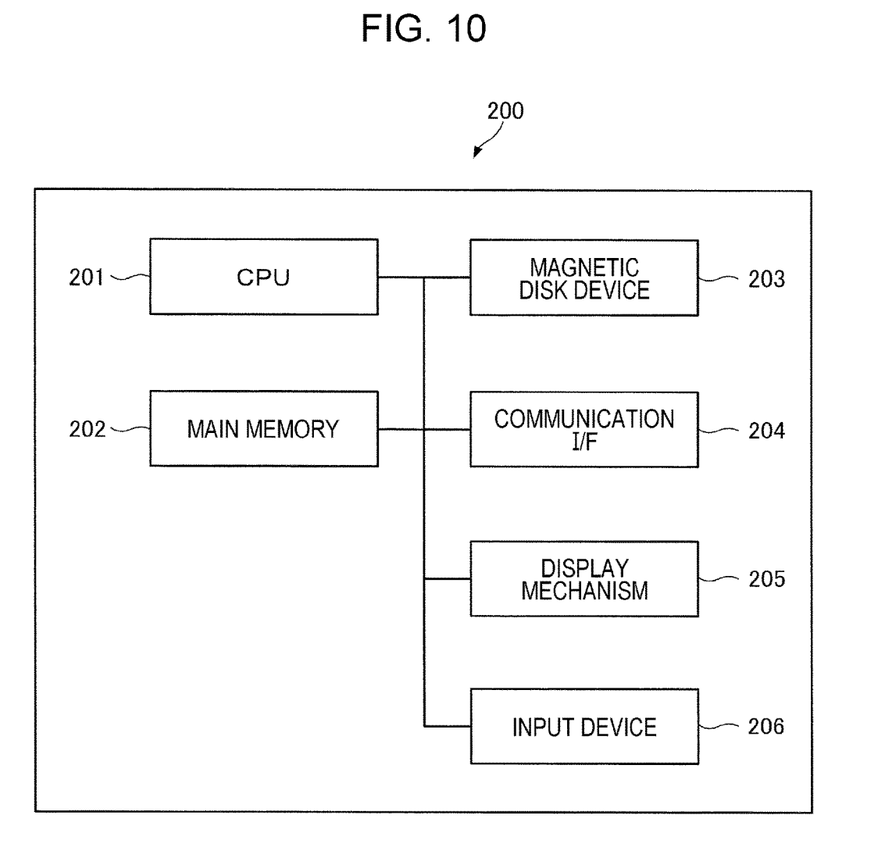
FIG. 10 is a diagram illustrating an example of a hardware configuration of a computer to which an exemplary embodiment of the present invention may be applied.

Processing by the image processing apparatus 100 according to an exemplary embodiment may be implemented by, for example, a general-purpose computer such as a personal computer (PC). A hardware configuration of a computer 200 which performs the processing will be explained below. FIG. 10 is a diagram illustrating an example of a hardware configuration of the computer 200 to which an exemplary embodiment may be applied.

The computer 200 includes a CPU 21, which serves as an arithmetic unit, and a main memory 202 and a magnetic disk device (HDD) 203, which serve as a memory. The CPU 201 executes various programs including an OS and an application program. The main memory 202 is a memory region in which various programs and data and the like to be used for execution of the various programs are stored, and the magnetic disk device 203 stores a program for implementing the functional units illustrated in FIG. 2. When the program is loaded to the main memory 202 and processing based on the program is executed by the CPU 201, the functional units are implemented.

The computer 200 further includes a communication interface (I/F) 204 for performing communication with an external device or the like, a display mechanism 205 including a video memory, a display, and the like, and an input device 206 including a keyboard, a mouse, and the like.

More specifically, when the CPU 201 reads a program for implementing the input original data acquisition unit 101, the input original size detection unit 102, the output original size identification unit 103, the additional image data generation unit 104, the output original data generation unit 106, the operation setting switching unit 108, and the like to the main memory 202 from, for example, the magnetic disk device 203 and executes the program, these functional units are implemented. Furthermore, the correspondence table storing unit 105 and the operation setting information storing unit 107 are implemented by, for example, the magnetic disk device 203 or the like.

Furthermore, a program for implementing an exemplary embodiment of the present invention may not only be supplied by a communication unit but also be stored in a recording medium such as a compact disc-read only memory (CD-ROM) and stored.

Various embodiments and modifications have been described above. Obviously, however, some or all of the exemplary embodiments and the modifications may be combined together.

Furthermore, the present disclosure is not intended to be limited to the foregoing embodiments, and various forms may be implemented without departing from the scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an acquisition unit that acquires image data generated by reading an image on an original;
an identification unit that identifies a predetermined output size without regard for an output sheet setting of the image processing apparatus, the predetermined output size being different from a size of the original; and
a generation unit that adds image data of a different image to the acquired image data, without changing a size of the image in the acquired image data, to generate image data corresponding to the predetermined output size, wherein the image data of the different image comprises an image including information to be transmitted to a viewer of the acquired image data.

2. The image processing apparatus according to claim 1, wherein the different image indicates that the image contained in the image data generated by the generation unit is generated by reading the image on the original.

3. The image processing apparatus according to claim 1, wherein the different image contains information regarding processing for generating the image data by reading the image on the original.

4. The image processing apparatus according to claim 3, wherein the information is provided for identifying a user who performed an operation input for issuing an instruction to generate the image data by reading the image on the original.

5. The image processing apparatus according to claim 1, wherein the identification unit identifies, according to a correspondence in that the size of the read original and the size of an original different from the size of the read original are associated with each other in advance, the predetermined size of the original.

6. The image processing apparatus according to claim 1, wherein the generation unit determines a position where the different image is to be added to the image, in accordance with a predetermined procedure.

7. The image processing apparatus according to claim 6, wherein the predetermined procedure is to determine the position where the different image is to be added according to contents of the image.

8. An image processing apparatus comprising:
an acquisition unit that acquires image data generated by reading an image on an original;
an output unit that outputs, in a case where the image processing apparatus is operating at a first operation setting, the image based on the image data acquired by the acquisition unit with a size corresponding to the original, and outputs, in a case where the image processing apparatus is operating at a second operation setting, the image based on the image data acquired by the acquisition unit with image data of a different image at a predetermined output size larger than the size corresponding to the original, without changing a size of the image, wherein the image data of the different image comprises an image including information to be transmitted to a viewer of the acquired image data, wherein the first operation setting and the second operation setting are selected without regard for an output sheet setting of the image processing apparatus.

9. The image processing apparatus according to claim 8, further comprising:
a switching unit that switches between the first operation setting and the second operation setting, in accordance with an operation input from a user.

10. A non-transitory computer readable medium storing a program causing a computer to execute a process for image processing, the process comprising:
acquiring image data generated by reading an image on an original;
identifying a predetermined output size without regard for an output sheet setting of the image processing apparatus, the predetermined output size being different from a size of the original; and
adding image data of a different image to the acquired image data, without changing a size of the image in the acquired image data, to generate image data corresponding to the predetermined output size, wherein the image data of the different image comprises an image including information to be transmitted to a viewer of the acquired image data.

* * * * *